J. F. KROST.
CAMERA.
APPLICATION FILED NOV. 27, 1914.

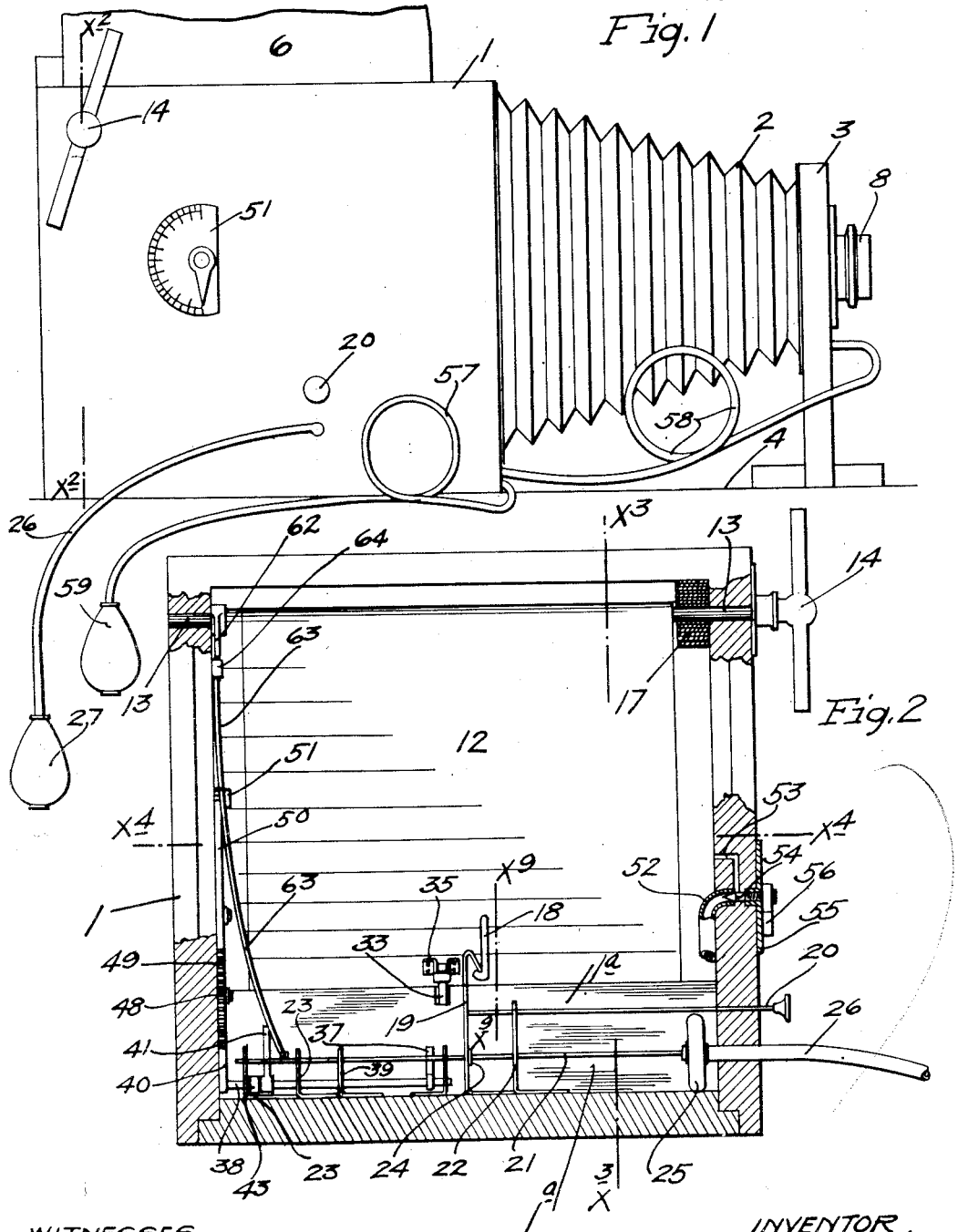

1,166,914.

Patented Jan. 4, 1916.
4 SHEETS—SHEET 2.

WITNESSES.
E. C. Skinkle
A. H. Opsahl

INVENTOR
John F. Krost
BY HIS ATTORNEYS
Williamson Merchant

J. F. KROST.
CAMERA.
APPLICATION FILED NOV. 27, 1914.

1,166,914.

Patented Jan. 4, 1916.
4 SHEETS—SHEET 3.

WITNESSES
E. C. Skinkle
A. H. Opsahl

INVENTOR
John F. Krost
BY HIS ATTORNEYS
Williamson & Merchant

J. F. KROST.
CAMERA.
APPLICATION FILED NOV. 27, 1914.

1,166,914.

Patented Jan. 4, 1916.
4 SHEETS—SHEET 4.

WITNESSES
E. C. Skinkle
A. H. Opsahl

INVENTOR
John F. Krost
BY HIS ATTORNEYS
Williamson & Merchant

UNITED STATES PATENT OFFICE.

JOHN FREDRICK KROST, OF MANKATO, MINNESOTA.

CAMERA.

1,166,914.   Specification of Letters Patent.   Patented Jan. 4, 1916.

Application filed November 27, 1914. Serial No. 874,116.

*To all whom it may concern:*

Be it known that I, JOHN FREDRICK KROST, a citizen of the United States, residing at Mankato, in the county of Blue Earth and State of Minnesota, have invented certain new and useful Improvements in Cameras; and I do hereby declare the following to be a full, clear, and exact description of the invention, such as will enable others skilled in the art to which it appertains to make and use the same.

Broadly, my invention relates to cameras, and has for its object to provide a camera of the reflecting type which is provided with a high speed shutter located in front of the reflector, so that the camera has all of the advantages of a high speed camera and of an ordinary camera of the reflector type. In cameras of the reflector type, it has hitherto been common to provide, back of the reflector, a so-called "adapter" comprising a negative plate holder and a focusing screen. In another arrangement well known as the "focal plane shutter," a curtain having slits or elongated light apertures, has been arranged to work back of the reflector. The first of the arrangements just above noted, is objectionable because the image is liable to move in the interval after it has been properly focused, and the time that the negative is positioned and the shutter operated. It is also objectionable for various other well known reasons. The focal plane curtain is objectionable because it produces image distortion, and furthermore, has other objectionable features.

My improved camera is illustrated in the accompanying drawings wherein like characters indicate like parts throughout the several views.

Figure 3:
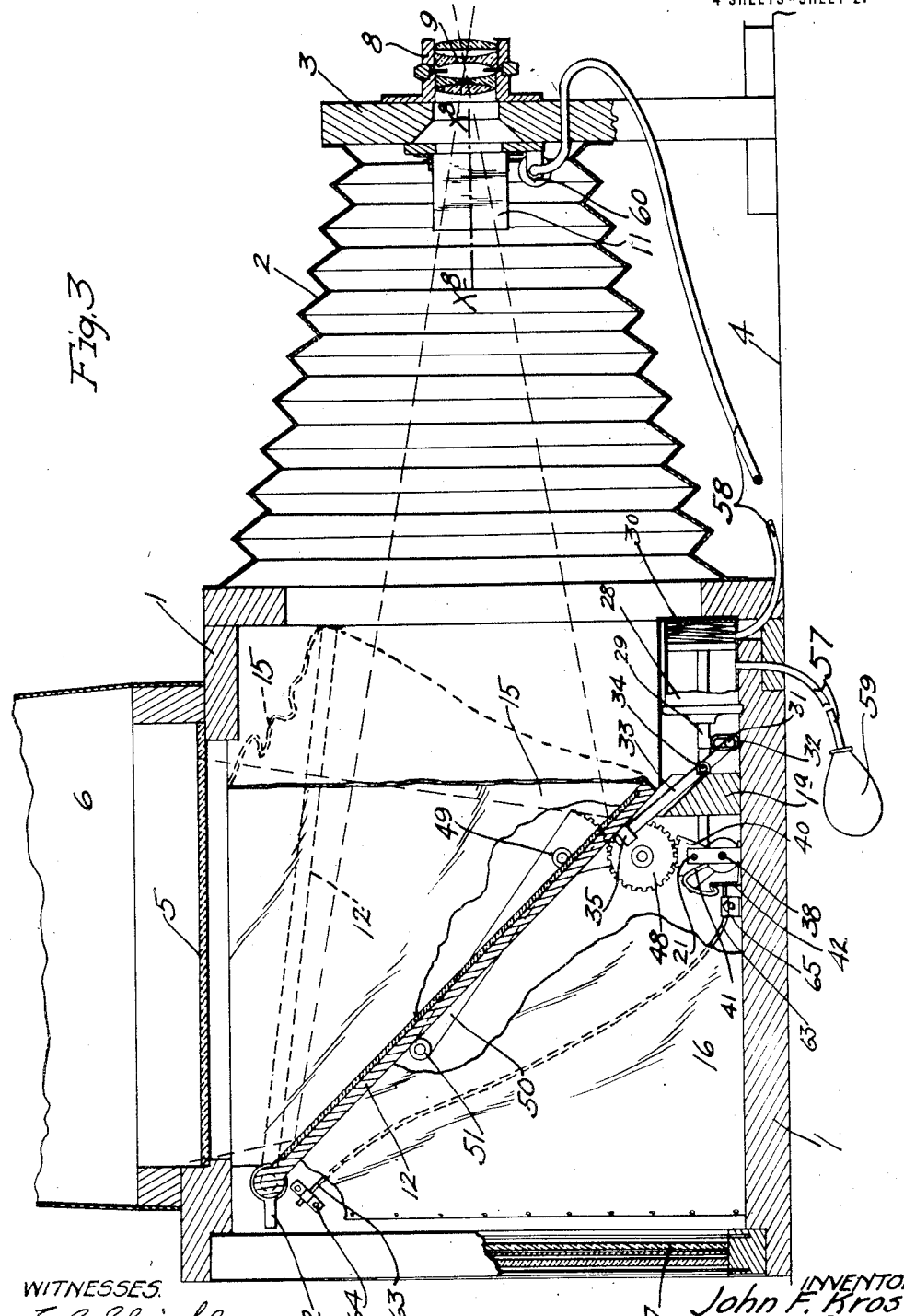
Figure 4:
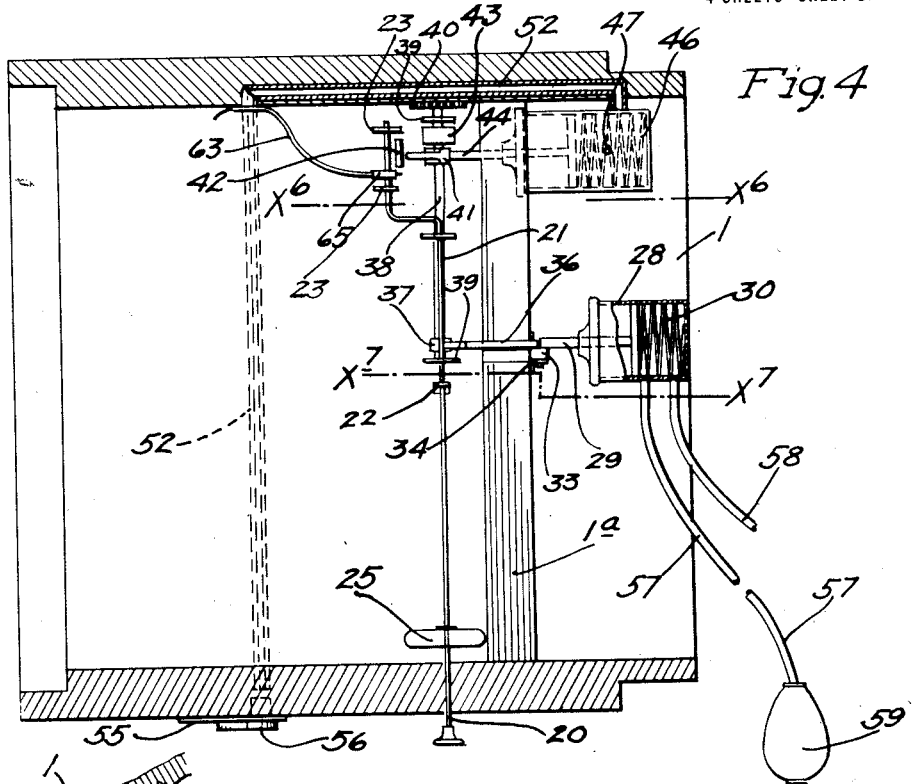
Figure 5:
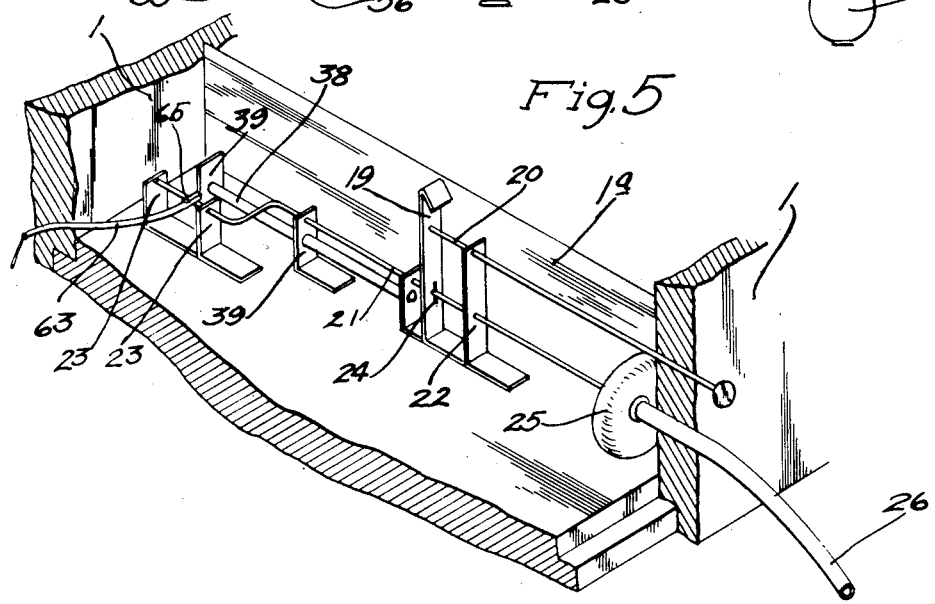
Figure 6:
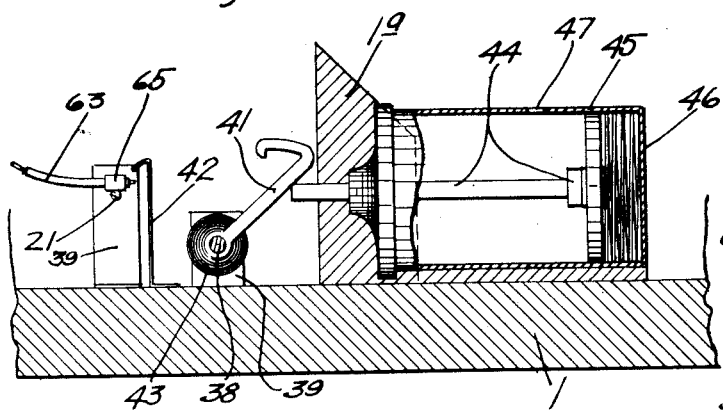
Figure 8:
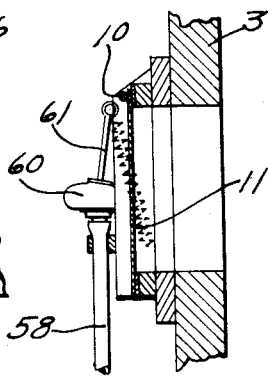
Figure 7:
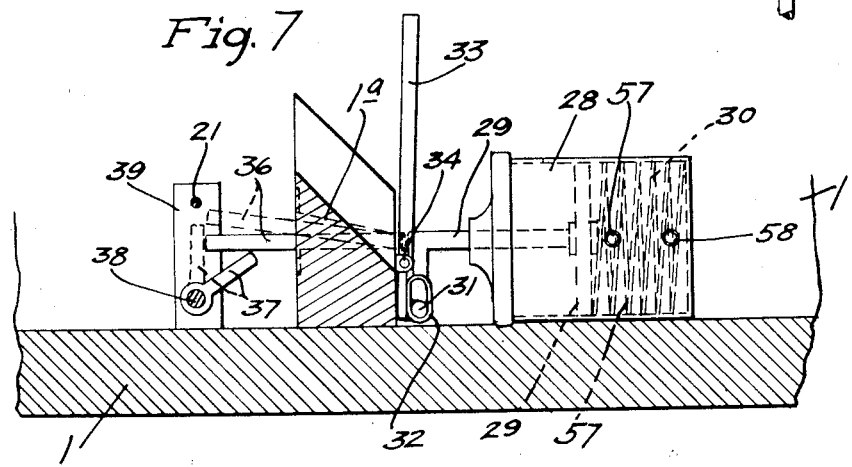
Figure 9:
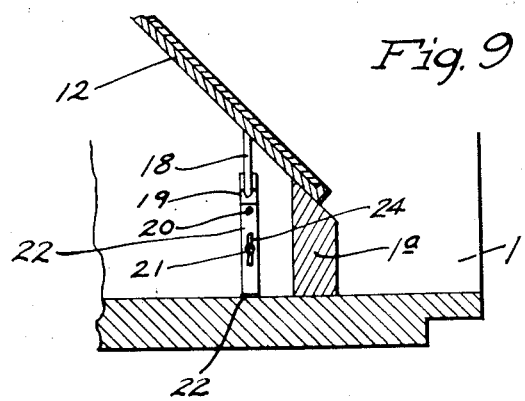

Referring to the drawings: Figure 1 is a side elevation showing the improved camera; Fig. 2 is a section taken approximately on the line $x^2$ $x^2$ on Fig. 1, but with some parts left in full; Fig. 3 is a vertical section taken from front to rear of the camera approximately on the line $x^3$ $x^3$ on Fig. 2; Fig. 4 is a horizontal section taken approximately on the line $x^4$ $x^4$ on Fig. 2, some parts being removed; Fig. 5 is a fragmentary perspective of certain of the parts shown in Fig. 4; Fig. 6 is a detail in section on the line $x^6$ $x^6$ on Fig. 4, some parts being broken away; Fig. 7 is a section taken approximately on the irregular line $x^7$ $x^7$ on Fig. 4; Fig. 8 is a horizontal section taken on the line $x^8$ $x^8$ on Fig. 3; and Fig. 9 is a detail in section taken approximately on the line $x^9$ $x^9$ on Fig. 2.

The numeral 1 indicates the box or case of the camera, the numeral 2 indicates the bellows, and the numeral 3 the lens board, which serves as a combined support for the lens and shutter. In practice, the box 1 will be secured to, and the lens board 3 will be slidably mounted on a suitable table or base board diagrammatically indicated at 4. In its top, the box 1 is provided with an orange colored focusing screen 5 and a hood 6. At its rear, the said box 1 is formed with a detachable plate holder 7. The lens board is provided with a light passage that alines with a lens tube 8 within which is a compound lens 9. Within the bellows 2, pivoted at 10 to a suitable support on the inner face of the lens board 3, is a spring-closed shutter 11. The reflecting mirror 12 is located within the box 1 and is pivotally connected thereto at its upper edge, by means of trunnions 13, one of which projects and is provided with a horizontal hand piece 14, by means of which the said reflector may be moved from its in-operative position shown by dotted lines, into its operative position shown by full lines in Fig. 3.

The pivoted reflector 12, at its side edges, is attached to the free edges of the upper and lower curtains 15 and 16. The upper curtains 15, at their upper edges, are attached to the upper portions of the sides of the box 1, whereas, the lower curtains 16, at their lower and rear edges, are attached to the bottom and rear portions of the sides of the said box. The said curtains 15 and 16, of course, have sufficient slack to permit free movements of the reflector, and their purpose, of course, is to prevent the light from leaking back against the negative.

A spring 17 of the clock spring type, is attached to the long trunnion 13 at its inner end, and to the box 1 at its outer end, and exerts a force which tends to throw the reflector from its operative position shown in full lines into its inoperative position shown by dotted lines in Fig. 3. To hold the reflector in its operative position, it is provided with a hook-nosed finger or lug 18 that is engaged by the hook-like end of a spring latch 19, which, at its lower end, is fastened to the bottom of the box 1. For releasing the spring latch 19 from the lock 18, to thereby release the reflector, I provide, in the preferred arrangement, two tripping rods 20 and 21. The said rod 20 works through one side of the box 1 and through a bearing bracket 22 on the bottom of the box, and at its outer end, it terminates in a knob adapted to be pressed at will, with a thumb or finger. The tripping rod 21 extends through the bracket 22, through the latch 19 and through a plurality of bearing brackets 23 on the bottom of the box. At its intermediate portion, the tripping rod 21 is provided with a pin or shoulder 24 that directly bears against the spring latch 19. One end of said tripping rod 21 is attached to one side of an expansible diaphragm 25, the other side of which is connected to one end of an air tube 26 that is extended through one side of the box 1 and is secured thereto, so that it holds the adjacent side of the said diaphragm anchored against lateral movements. The said air tube 26 extends to an air bulb 27.

As a part of the mechanism for automatically controlling the movements of the shutter in respect to the movements of the reflector, I provide a small cylinder and piston air motor 28—29, the cylinder of which is suitably secured to the bottom of the box 1. A coiled spring 30, within the cylinder 28, yieldingly forces the piston forward. The piston 29, at its outer end, is provided with a downturned portion that carries a wrist pin 31. The wrist pin 31 works in an elongated slot 32 of a motor operating lever 33 that is intermediately pivoted at 34 to a block 1ᵃ on the bottom of the box 1. The upper free end of this lever 33 is adapted to be engaged with and disengaged from an eye or loop 35 carried on the back of the free lower portion of the reflector 12.

A loose rod 36, which operates as a sort of supplemental piston rod, is loosely mounted for sliding and vertical angular movements in the bearing block 1ᵃ. The rear end of this rod 36 stands in alinement with the outer end of the rod of the piston 34, and its front end stands in position to be engaged by an arm 37 of a rock shaft 38, which latter is journaled in suitable bearings 39 on the bottom of the box 1. The rock shaft 38, at one end, carries a segmental gear 40 and near the said gear it is provided with an arm 41 having a hook end that normally engages the hook end of a spring latch 42, the lower end of which is attached to the bottom of the box 1 (see Fig. 3, which shows the same arm 41 in its normal position, and see also Fig. 7, which shows the said arm moved from normal position).

A coiled spring 43 of the clock spring type, is attached at its inner end to the shaft 38, and, at its outer end, to one of the bearings 39, and exerts a force which tends to move the said arm 41 and also the said shaft 38 in a direction from the left toward the right, in respect to Figs. 3 and 6. The said arm 41 is arranged to operate on the projecting end of the rod of a piston 44 that works in a cylinder 45 secured on the bottom of the box 1. A light coiled spring 46, compressed between the piston and the head of the cylinder 45, tends to move the said piston forward, or toward the left, in respect to Figs. 3 and 6. The tension of this spring 45, however, is far from sufficient to overcome the tension of the spring 43. In the piston 45 is an air intake port 47, the purpose of which will hereinafter appear.

The segmental gear 40 on the rock shaft 38 meshes with an intermediate gear 48 journaled to one side of the box 1 and engaged with an upper segmental gear 49 pivoted to the same side of the said box 1 and provided with a long arm 50 having a lateral projection, preferably in the form of a roller 51 arranged to be engaged by the adjacent edge of the reflector 12 (see particularly Figs. 2, 3 and 4).

The piston and cylinder 44—45 operate as a retarding device for timing the closing movement of the shutter 11, as will hereafter more fully appear. The said cylinder 45 has an air discharge conduit 52—53 (see particularly Figs. 2 and 4) the outlet of which is adapted to be opened or closed, more or less, by means of a valve 54, preferably of the needle type, and which valve, as shown, has screw-threaded engagement with a graduated plate 55 on the outer side of the box 1, and is provided with a position indicating arm 56 that affords a finger piece for moving the said valve and coöperating with the graduations on said plate 55 to indicate the position of said valve.

Two air tubes 57 and 58 lead from the cylinder 28 to points on opposite sides of the normal position of the piston 29. The free end of the tube 57 is provided with an air bulb 59, and the extended end of the tube 58 is connected to an expansible diaphragm 60, one side of which diaphragm is suitably anchored and the other side of which is connected by a short link 61 to the shutter 11, at a point slightly concentric to the pivot thereof.

On the shaft or pivoted edge of the reflector 12 is a projecting tripper lug 62, which, when the shutter approximately reaches the position indicated by dotted lines in Fig. 3, engages the upper end of an incased endwise movable release wire 63, the upper end of which works through a fixed bearing 64 on the box 1, and the lower end of which works through a laterally shiftable bearing 65 that is carried by the laterally offset inner end of the tripping rod 21, already described. In the normal position of the tripping rod 21, the free lower end of the releasing wire 63 stands laterally out of line with the free end of the spring latch 42, but when the said tripping rod 21 is moved toward the left to release the reflector latch 19, the lower end of the said releasing wire 63 will be set in line with the free end of the said latch 42. When the lug 62 engages the upper end of the said releasing wire, the lower end thereof, will be forced against the latch 42 and will release the same from the hook end of the arm 41.

*Summary of operation.*—Fig. 3 shows the camera with the shutter open and with the reflecting mirror turned down into a position to reflect the image onto the reflecting screen 5. It also shows the plate holder and sensitized plate properly positioned back of the reflector, but with all light cut off therefrom.

The reflector may be released by either of two manipulations, to-wit, either by forcing the tripping rod 20 or the tripping rod 21 toward the left, in respect to Fig. 2. We will first describe the operation resulting from forcing of the tripping rod 20 toward the left. When the said rod 20 is forced toward the left, the spring latch 19 is released from the lug 18 of the said reflector, and the reflector actuating spring 17 then imparts a movement of the reflector from its full line position into its dotted line position shown in Fig. 3. Under the initial movement of the reflector 12, the loop 35, operating on the upper end of the lever 33, causes the piston 29 to move rearward from the position shown in Fig. 3, into the postions shown in Figs. 4 and 7, and then the said loop 35 leaves the said lever and passes upward with the reflector. If the above noted movement of the reflector does not impart quite as much movement to the said piston, as above stated, the spring 30 will complete such movement.

Normally, the shutter operating diaphragm 60 is expanded so that the shutter 11 will be open. The initial rearward movement of the piston 29, as just above described, will produce a suction which will relieve the diaphragm 60 from pressure, and cause it to contract so that the shutter 11 will be quickly closed by this action and by coöperation of its closing spring. This closing of the shutter, in fact, is so quickly produced, that no light will have a chance to reach the sensitized plate. The shutter will remain closed as long as the reflector is turned into its upper or inoperative position shown by dotted lines in Fig. 3. Attention is here called to the fact that under the above noted movement of the shutter, its tripping lug 62 engages the tripping wire 63, to force the lower end of said wire forward but without result, because the forward end of the said tripping wire, at such times, stands laterally out of line with the spring latch 42, which controls the automatic shutter timing mechanism. Here it should be stated that the said tripping wire 63 is of a well known commercial type in which the said wire will be yieldingly retracted or forced rearward. Under the operation just described, it would therefore seem that the shutter is automatically closed, but will not be automatically opened. However, the piston 29 now stands at the rear of the port which connects the tube 57 to the cylinder 28, hence, leaving the tubes 57 and 58 directly connected through the said cylinder. Hence, by pressing and releasing the bulb 59, the shutter 11 may be opened and closed, at will, so that a time exposure of any desired duration may be given by hand manipulation.

As already described, compression of the bulb 27 expands the diaphragm 25, moving the tripping rod 21 toward the left, in respect to Figs. 2 and 5, thereby accomplishing two things, namely, the release of the spring latch 19 from the reflector lug 18, and a lateral movement of the lower front end of the tripping wire 63 into alinement with the spring latch 42. When the reflector is released by this operation, the spring 17 moves the same upward and the shutter 11 will be closed automatically by movements of the lever 33 and piston 29, as just above described, in connection with the operation resulting from manipulation of the tripping rod 20.

When under the present action, the reflector nearly reaches its dotted line position in Fig. 3, its lug 62 engages the tripping wire 63 and forces the lower front end of the latter against the spring latch 42, thereby releasing said latch from the lever 41. When the said lever 41 is released, the spring 43 oscillates the same and the shaft 38 forward, or toward the right, in respect to Figs. 3, 4, 6 and 7. When the arm 41 is locked to the latch 42, the arm 37 will stand toward the left a little farther than indicated by dotted lines in the said Fig. 7, and when the said arm 41 reaches the position shown in Fig. 6, the arm 37 will reach the position indicated by full lines in Fig. 7. The time required for the said arms 41 and 37 to move from the one extreme position to the other, just indicated, will depend on the extent to which the retarding valve 54 is opened. The initial movement of the arm 37 from its dotted line position toward its full line position in Fig. 7, presses the loose rod 36 forward, and the latter, acting on the end of the rod of piston 29, forces the said piston forward, or toward the right in respect to Fig. 7, and this compresses the air in the cylinder 28, and, through the tube 58, expands the diaphragm 60 and forces the shutter 11 into its open position. The shutter will be held open until the arm 37 passes below the rear end of the rod 36, and thereby permits the said rod 36 and piston 29 to be forced again rearward by the spring 30. The instant the said arm 37 slips below the rod 36 and the spring 30, operating as just stated, the diaphragm 60 will be relieved from pressure and the shutter will be instantly closed. The spring 43 must, of course, be strong enough to overcome the combined tension of the springs 30 and 46.

It is important to note that the air port 47 in the cylinder 48 is so located that the piston 49 makes a sufficient initial forward movement, under very slight resistance, to permit the shutter to be almost instantaneously moved from its closed into its open position. The time retarding action, during which the shutter remains open, takes place while the piston 49 moves forward in the cylinder 48, beyond the port 47.

Fig. 7 shows the position in which the lever 33 will stand while the mirror is open, and in such position, its free upper end stands where it will reënter the loop 35 on the mirror when the latter is again forced back to its normal position. The mirror is returned to its operative or down-turned position shown by full lines in Fig. 3, by hand operation produced by taking hold of the hand piece 14, and when it is turned back to its said normal position, the spring latch 19 will again engage its lug 18. The movement of the mirror back to normal position, as just stated, accomplishes two important results, to-wit: First, the mirror engages the roller 51 of the lever 50, and through the gears 49, 48 and 40, oscillates the shaft 38 backward, thereby carrying the hook end of the arm 41 into reëngagement with the spring latch 42, and moving the arms 37 back under and rearward of the rear end of the loose rod 36. This re-sets the automatic shutter timing mechanism. The latter part of the return or downward movement of the mirror reëngages its loop 35 with the free end of the lever 33 and causes the latter to restore the piston 29 to its normal position shown in Fig. 3, and with the result that the compression of the air within the cylinder 28, thus produced and delivered through the tube 58, will expand the diaphragm 60 and again force the shutter 11 into its open position.

In this improved camera, it is important that the focusing screen which coöperates with the mirror, be orange red, or other color that will stop the actinic rays. Otherwise stated, the said focusing screen is a non-actinic screen which prevents the actinic rays from reaching the negative through the camera box while the mirror is in an operative position, or at other times, for that matter. The expression "plate holder" is herein used to include any kind of a device for properly holding in position a sensitized surface upon which a photographic negative may be taken.

What I claim is:

1. A camera having a negative holder, a pivoted mirror located in front of said plate holder, a focusing screen above said mirror, and a shutter in front of said mirror, combined with connections for opening said shutter when said mirror is in position to reflect onto said screen, and for closing said shutter while said mirror is in an inoperative position.

2. A camera having a negative holder, a pivoted mirror located in front of said plate holder, a focusing screen above said mirror, a shutter in front of said mirror, combined with connections for opening said shutter when said mirror is in position to reflect onto said screen, and for closing said shutter while said mirror is in an inoperative position, and connections including an adjustable timed retarding device.

3. A camera having a negative holder, a pivoted mirror located in front of said plate holder, a shutter in front of said mirror, and pneumatic mirror actuated connections for operating said shutter.

4. In a camera, the combination with a focusing screen and a mirror mounted for angular movements in respect to said screen, of a lens and shutter in front of said mirror, a spring tending to move said mirror into an inoperative position, a latch normally holding said mirror in an operative position, means for tripping said latch, and pneumatic shutter actuating connections controlled by movements of said mirror and arranged to open said shutter when said mirror is in an operative position, and to close said shutter when said mirror is in an inoperative position.

5. In a camera, the combination with a plate holder focusing screen and pivoted mirror coöperating with the latter, of a spring tending to move said mirror into an inoperative position, a latch for holding said mirror in an operative position, a shutter in front of said mirror, and pneumatic shutter actuating connections controlled by movements of said mirror and arranged to hold said shutter opened when said mirror is in an operative position, to close said shutter while said mirror is moving from its operative into its inoperative position, and to release and permit the closing of said shutter while said mirror is in an inoperative position.

6. In a camera, the combination with a plate holder focusing screen and pivoted mirror coöperating with the latter, of a spring tending to move said mirror into an inoperative position, a latch for holding said mirror in an operative position, a shutter in front of said mirror, and pneumatic shutter actuating connections controlled by movements of said mirror and arranged to hold said shutter opened when said mirror is in an operative position, to close said shutter while said mirror is moving from its operative into its inoperative position, and to release and permit the closing of said shutter while said mirror is in an inoperative position, and means for accomplishing the latter noted function, including an adjustable retarding device for regulating the same during which said shutter will remain open.

7. In a camera, the combination with a pivoted mirror and means tending to close the same, of a latch for holding said mirror in an operative position, a trip operative at will to release said latch, a shutter and a lens in front of said mirror, a pneumatic shutter actuating device including a diaphragm, a cylinder and piston and a tube connecting said cylinder and diaphragm, and a shutter actuated lever operative on said piston to throw said diaphragm, to open said shutter when said mirror is in an operative position, and to close said shutter under initial movement of said mirror toward its inoperative position.

8. A camera having a plate holder, a pivoted mirror located in front of said negative holder, a shutter in front of said mirror, and a colored focusing screen coöperating with said mirror.

9. In a camera, the combination with a plate holder, focusing screen and movable mirror coöperating with the latter, of a shutter in front of said mirror, and shutter actuating connections controlled by movements of said mirror and arranged to hold said shutter open when said mirror is in an operative position, to close said shutter while said mirror is moving from its operative into its inoperative position, and to release and permit the opening and closing movement of the shutter while said mirror is in an inoperative position.

10. In a camera, the combination with a plate holder, focusing screen and movable mirror coöperating with the latter, of a shutter in front of said mirror and shutter actuating connections controlled by movements of said mirror and arranged to hold said shutter open when said mirror is in an operative position, to close said shutter while said mirror is moving from its operative into its inoperative position, and to release and permit the opening and closing movement of the shutter while said mirror is in an inoperative position, including an adjustable retarding device for regulating the same during which the said shutter will remain open.

11. In a camera, the combination with a case having a plate holder at its rear and a light passage in front, of an adjustable bellows attached to said case and extended forward thereof, a lens and a shutter at the front of said bellows, a mirror movably mounted within said case in front of said plate holder and at the rear of said bellows, and extensible connections between said mirror and shutter arranged to open said shutter when said mirror is in an operative position and to close said shutter when said mirror is in an inoperative position.

12. In a camera, the combination with a case having a plate holder at its rear and a light passage in front, of an adjustable bellows attached to said case and extended forward thereof, a lens and a shutter at the front of said bellows, a mirror movably mounted within said case in front of said plate holder and at the rear of said bellows, and an extensible connection including a timed pneumatic device arranged to open said shutter when said mirror is in an operative position and to close said shutter when said mirror is in an inoperative position.

In testimony whereof I affix my signature in presence of two witnesses.

JOHN FREDRICK KROST.

Witnesses:
LOUISE RAINERSON,
A. R. PFAU, Jr.